United States Patent [19]

Wevers

[11] 4,427,210

[45] Jan. 24, 1984

[54] WHEELCHAIR AND OCCUPANT RESTRAINT SYSTEM

[75] Inventor: Henk Wevers, Kingston, Canada

[73] Assignee: Queen's University at Kingston, Kingston, Canada

[21] Appl. No.: 419,382

[22] Filed: Sep. 17, 1982

[30] Foreign Application Priority Data

Mar. 2, 1982 [CA] Canada .................................. 397403

[51] Int. Cl.[3] .......................... B60P 7/08; A62B 35/00

[52] U.S. Cl. ......................... 280/289 WC; 248/316 R; 248/503.1; 280/242 WC; 280/801; 296/65 R; 297/DIG. 4; 410/23; 410/51

[58] Field of Search .............. 296/65 R; 280/801-808, 280/242 WC, 289 WC, 290; 297/DIG. 4; 248/503, 503.1, 316 R; 403/351, 409, DIG. 8, 104; 410/10, 11, 12, 23, 51, 97, 100, 103

[56] References Cited

U.S. PATENT DOCUMENTS

| | | | |
|---|---|---|---|
| 3,850,399 | 11/1974 | McLymont et al. | 248/316 R X |
| 4,060,271 | 11/1977 | Williams | 296/65 R |
| 4,257,644 | 3/1981 | Stephens | 296/65 R |

FOREIGN PATENT DOCUMENTS

| | | | |
|---|---|---|---|
| 2814131 | 10/1979 | Fed. Rep. of Germany | 410/11 |
| 2845870 | 5/1980 | Fed. Rep. of Germany | 297/DIG. 4 |
| 2927204 | 1/1981 | Fed. Rep. of Germany | 248/503.1 |
| 3002133 | 7/1981 | Fed. Rep. of Germany | 280/242 WC |

*Primary Examiner*—Joseph F. Peters, Jr.
*Assistant Examiner*—Mitchell J. Hill
*Attorney, Agent, or Firm*—Richard J. Hicks; Stanley E. Johnson

[57] ABSTRACT

A wheelchair and occupant restraint system for use in a vehicle in which a pair of brackets are mounted on spaced apart frame members of the wheel chair. One end of each of a pair of flexible straps are secured to an anchor on the floor of the vehicle and the other end of each strap is releasably secured to one of the brackets. One end of each of a second pair of straps is secured to a respective bracket and the second pair of straps is arranged to releasably secure the occupant in the chair. The straps and brackets are so arranged that forces applied to the second pair of straps are transmitted directly to the floor anchors via the first pair of straps.

5 Claims, 3 Drawing Figures

WHEELCHAIR AND OCCUPANT RESTRAINT SYSTEM

This invention relates to a wheelchair and occupant restraint system.

Handicapped persons who are confined to a wheelchair frequently require transportation in their daily lives and considerable attention has been directed to the development of vehicles especially adapted to their needs. Vehicles having lifting ramps to facilitate loading and unloading the handicapped person while seated in his or her wheelchair have been developed, and numerous ways of securing the wheelchair against movement once it is in the vehicle have been suggested. Attention is directed, for example, to the wheelchair tie down system described in U.S. Pat. No. 4,257,644 issued Mar. 24, 1981 to R. E. Stephens. Most of such systems require some modifications to a vehicle floor to provide tie downs for releasable straps designed to engage selected portions of the wheelchair frame at the front and rear thereof, and are generally adequate to secure the wheelchair from backward or forward movement as the vehicle accelerates or decelerates. Such systems do not, however, do anything to restrain the person in the wheelchair in the event of a sudden or violent deceleration. There is, therefore, a need for a safe and relatively inexpensive system which will restrain not only the wheelchair but also its occupant in the event of a sudden deceleration. One of the problems encountered in the provision of a personal restraint system is that of location of the restraint anchors so that the restraint will fulfil its function without injuring the restrained person and without tearing loose. A wheelchair is generally of relatively light weight construction and there are relatively few points which are sufficiently strong to accept the g loading which may be imposed by a restraint anchor under shock load. Generally such points are low on the frame thereof and awkwardly situated for attachment of a seat belt in an anatomically safe manner.

It is, therefore, an object of the present invention to provide a simple and safe combined wheelchair and occupant restraint system.

Thus, by one aspect of this invention there is provided a wheelchair tie down apparatus for use in a vehicle provided with anchor means, in a designated tie down floor area, adjacent each corner of said wheelchair, comprising:

a pair of bracket means each arranged for mounting on respective laterally spaced apart frame members of said wheelchair, adjacent the rear and seat thereof;

a first pair of flexible straps, each strap having a tethered end for connection to a respective one of said anchor means adjacent the front of said wheelchair, and a distal end having a wheelchair engaging means;

a second pair of flexible straps, each strap having a tethered end for connection to a respective one of said anchor means adjacent the rear of said wheelchair, and a distal end having means for engaging said bracket means;

a third pair of flexible straps, each strap having a tethered end connected to a respective one of said bracket means extendible around the hips of an occupant in said wheelchair to a distal end arranged to releasably and adjustably engage with the distal end of the other of said third pair of straps so as to secure said occupant in said wheelchair;

each said bracket being arranged on its respective said frame member such that its associated straps of said second and third pairs respectively lie, in operational position, in a substantially straight line so as to transmit forces applied to said third pair of straps directly to said anchor means for said second pair of straps.

The invention will be described in more detail hereinafter with reference to the drawings in which.

Figure 1:
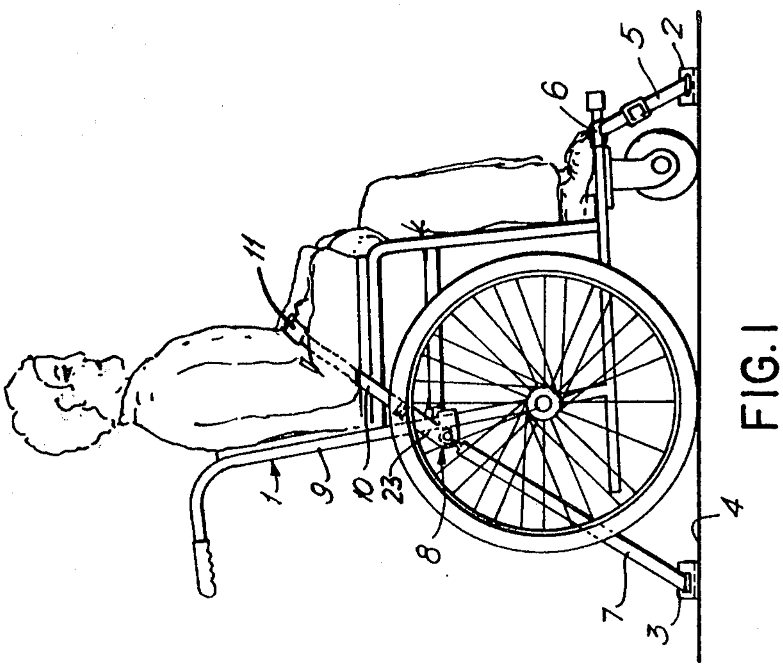
FIG. 1 is a side elevational sketch of a wheelchair incorporating the restraint system according to one embodiment of the invention.

The restraint system of the present invention may be adapted for use with almost all models of conventional wheelchairs, such as that illustrated schematically as 1 in FIG. 1. After positioning the chair at a designated tie down area in a vehicle (not shown) provided with fore and aft anchor members 2 and 3 respectively in a floor 4 on each side of the wheelchair 1, the chair is secured against rearward movement by means of adjustable, releasable straps 5 secured at one end to anchors 2 and at the distal end to any convenient part of the wheelchair frame via a conventional hook 6 or the like.

The chair is secured against forward movement by means of adjustable, releasable straps 7 secured at one end to anchors 3 and at the distal end to a bracket 8, to be described in more detail hereinafter with reference to FIGS. 2 and 3, adjustably secured to a tubular frame member 9 of the wheelchair 1. The belts 7 generally subtend an angle of about 35°-45°, preferably 40° to the horizontal floor 4. One end of a releasable, adjustable lap belt 10 is firmly secured to each of the brackets 8, and the belt 10 is arranged to pass around the lap of an occupant sitting in the chair 1, with a conventional easily releasable and length adjusting buckle 11 thereof substantially centrally located in front of the occupant.

Figure 2:
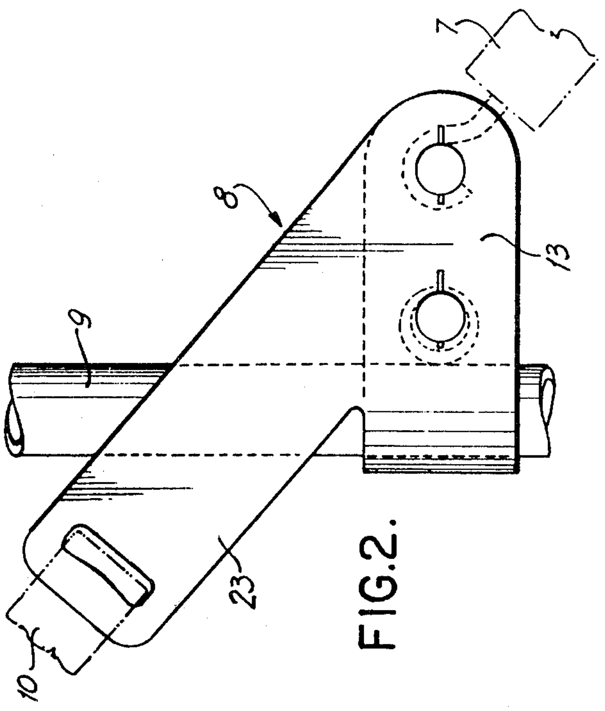
FIG. 2 is an enlarged side view of the wheelchair clamping bracket shown in the embodiment of FIG. 1.
Figure 3:
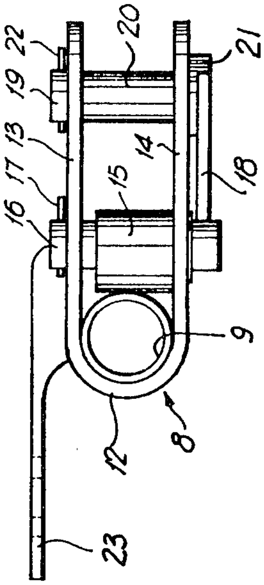
FIG. 3 is an enlarged bottom view of the bracket of FIG. 2.

As seen more clearly in FIGS. 2 and 3, the bracket 8 comprises a U-shaped portion 12 arranged to fit snugly around a vertical tubular frame member 9 with the legs 13, 14, extending horizontally and rearwardly relative to the chair. The U-shaped bracket is clampingly engaged at a selected position on frame member 9 by means of an eccentric cam surface 15 on a pin 16 rotatably mounted between arms 13, 14. Pin 16 may be provided with a locking pin 17 or a head (not shown) at one end thereof, and may be rotated by means of a radially extending lever pin 18 at the other end thereof so that the surface 15 clampingly engages or releases member 9 as required. Preferably, but not essentially, surface 15 is provided by a thermoplastic, preferably nylon, cylindrical sleeve rigidly coaxially secured on pin 16.

A pin 20, parallel to and rearwardly of pin 16, is mounted between arms 13, 14 and held in place by head 21 at one end thereof and a removable locking pin 22 adjacent the other end thereof, so as to provide an anchor for the distal end of straps 7. Generally a hook 23 is provided at the distal end of straps 7 and arranged to hook over pin 20 in releasable engagement therewith. An arm 23 extends forwardly and upwardly from arm 13, at an angle of about 35°-45°, preferably 40°, thereto preferably with its longitudinal axis extending through pin 16, so that strap 7, arm 23 and lap belt 10 secured to the free end thereof lie in a substantially straight line.

In the event of a sudden deceleration of the vehicle containing the wheelchair and occupant restrained using the system as hereindescribed, the resultant forces applied to the lap belt 10 by the occupant as he moves forward are transmitted directly to the floor anchors 3 via straps 7 and bracket 8, and no reliance is placed upon the strength of the generally lightweight frame of the wheelchair itself to withstand an impact loading.

I claim:

1. A wheelchair tie down apparatus for use in a vehicle provided with anchor means, in a designated tie down floor area, adjacent each corner of said wheelchair, comprising:

a pair of bracket means each arranged for mounting on respective laterally spaced apart frame members of said wheelchair, adjacent the rear and seat thereof;

a first pair of flexible straps, each strap having a tethered end for connection to a respective one of said anchor means adjacent the front of said wheelchair, and a distal end having a wheelchair engaging means;

a second pair of flexible straps, each strap having a tethered end for connection to a respective one of said anchor means adjacent the rear of said wheelchair, and a distal end having means for engaging said bracket means;

a third pair of flexible straps, each strap having a tethered end connected to a respective one of said bracket means and extendible around the hips of an occupant in said wheelchair to a distal end arranged to releasably and adjustably engage with the distal end of the other of said third pair of straps so as to secure said occupant in said wheelchair;

each said bracket being arranged on its respective said frame member such that its associated straps of said second and third pairs respectively lie, in operational position, in a substantially straight line so as to transmit forces applied to said third pair of straps directly to said anchor means for said second pair of straps.

2. In a wheelchair tie down apparatus for use in a vehicle provided with anchor means in a designated tie down floor area, adjacent each corner of a wheelchair, and a flexible strap for each of said anchor means, said straps having a tethered end connected to an anchor means and a distal end having engaging means thereon for securing said wheelchair, the improvement comprising:

(a) a pair of bracket members arranged for mounting on respective laterally spaced apart frame members of said wheelchair adjacent the rear and seat thereof and each including means for engagement with a said distal end of one of said straps; and (b) a pair of flexible straps, each having a tethered end connected to a respective one of said bracket members and extendible around the hips of an occupant in said wheelchair to a distal end arranged to releasably and adjustably engage with the distal end of the other of said pair of straps so as to restrain an occupant in said wheelchair; each of said brackets being arrangable on its respective frame member such that its associated straps lie, in operational position, in a substantially straight line so as to transmit forces applied to said occupant restraining straps directly to said anchor means.

3. A wheelchair tie down apparatus as claimed in claim 1 or 2 including means to releasably lock each said bracket member against a respective said frame member.

4. A wheelchair tie down apparatus as claimed in claim 1 or 2 including cam means associated with each of said bracket members to releasably secure said bracket member to a respective said frame member.

5. A wheelchair tie down apparatus as claimed in claim 1 or 2 wherein said flexible straps, in operative position, subtend an angle between 35° and 45° to the floor of said vehicle.

* * * * *